United States Patent Office 2,876,220
Patented Mar. 3, 1959

2,876,220

2,3-DICHLORO-N-(PIPERONLYIDENE)ANILINE

Dale N. Robertson, Midland, Mich., assignor to The Dow Chemical Company, Midland, Mich., a corporation of Delaware No Drawing. Application April 10, 1957
Serial No. 651,814

1 Claim. (Cl. 260—240)

The present invention relates to a new compound which is a condensation product of 2,3-dichloroaniline with piperonal. The compound is characterized by the formula

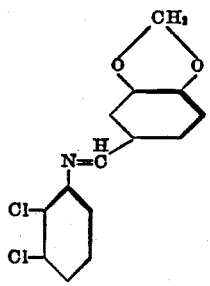

The compound is a crystalline solid somewhat soluble in many organic solvents and of low solubility in water. It is useful as an antimicrobial and is adapted to be employed as an active constituent of disinfectant and germicidal compositions for the control of many bacterial and fungal organisms such as *Salmonella typhosa, Staphylococcus aureus, Aspergillus terreus, Rhizopus nigricans,* and the like.

The new compound may be prepared by condensing 2,3-dichloroaniline and piperonal in the presence of an inert organic solvent such as alcohol or benzene. The amount of reactants to be employed is not critical, some of the desired product being produced with any proportion of ingredients. Optimum yields are usually obtained when employing substantially equimolecular proportions of the reactants. The reaction proceeds smoothly at temperatures of from 10° to 140° C. with the formation of the desired product and water of reaction.

In carrying out the reaction, the 2,3-dichloroaniline, piperonal and solvent are mixed or otherwise blended together and the resulting mixture maintained at the reaction temperature for a period of time to assure completion of the reaction. During the reaction, the desired product sometimes precipitates in the reaction mixture as a crystalline solid. Upon completion of the reaction, the reaction mixture may be cooled to precipitate the desired product or to precipitate further product. The product may be separated in conventional manner such as by filtration or decantation and thereafter purified by recrystallization from a suitable organic solvent.

The following example illustrates the invention but is not to be construed as limiting the same.

Example.—*2,3-dichloro-N-(piperonylidene)aniline*

2,3-dichloroaniline (8.1 grams; 0.05 mole) was dispersed in 7.5 grams (0.05 mole) of piperonal and 25 milliliters of alcohol thereafter added to the mixture. The resulting mixture was heated at the boiling temperature and under reflux for 2 hours, and then set aside for several days at room temperature. During the reaction, a 2,3-dichloro-N-(piperonylidene)aniline product precipitated in the reaction mixture as a crystalline solid. This product was separated by filtration, recrystallized from alcohol and dried. The dried product melted at from 104° to 110° C.

The new 2,3-dichloro-N-(piperonylidene)aniline compound has been tested and found to be effective as an antimicrobial. For such use, the product may be dispersed on an inert finely divided solid and employed as a dust. Also, such mixture may be dispersed in water with the aid of a wetting agent, and the resulting aqueous disperson employed as a spray. In other procedures, the product may be employed as a constituent of oil-in-water emulsions, or water dispersons with or without the addition of wetting, dispersing or emulsifying agents. In representative operations, 2,3-dichloro-N-(piperonylidene)aniline was incorporated in a solid nutrient agar medium in an amount sufficient to supply 0.05 percent by weight of toxicant. Portions of the medium were then inoculated with one of the organisms *Salmonella typhosa, Staphylococcus aureus, Aspergillus terreus* and *Rhizopus nigricans* and the inoculated media incubated at 30° C. After three days of incubation, observations showed that the aniline compound had given a 100 percent control of the growth of the test organisms.

I claim:
2,3-dichloro-N-(piperonylidene)aniline.

References Cited in the file of this patent

C. Lorenz: Berichte, 14, pages 785–795, 1881.

F. J. Moore and R. D. Gale: Am. Chem. Soc. J., 30, pages 394–404, 1908.

Flear et al.: J. Econ. Ent., vol. 40, No. 5, pages 736–741 (1947).